US006183649B1

(12) United States Patent
Fontana

(10) Patent No.: US 6,183,649 B1
(45) Date of Patent: Feb. 6, 2001

(54) METHOD FOR TREATING WATER CIRCULATING SYSTEMS

(76) Inventor: Michael W. Fontana, 5 Yale Ave., Riverside, Claymont, DE (US) 19703

( * ) Notice: Under 35 U.S.C. 154(b), the term of this patent shall be extended for 0 days.

(21) Appl. No.: 09/167,336

(22) Filed: Oct. 7, 1998

(51) Int. Cl.[7] .................................................. C02F 5/14
(52) U.S. Cl. ........................ 210/699; 210/701; 210/764; 252/180; 252/181; 252/389.23; 252/389.54; 252/395; 422/15; 422/17; 514/665; 134/3; 134/22.19
(58) Field of Search .................................... 210/698–701, 210/764; 252/180, 181, 389.23, 389.22, 389.54, 395; 422/15–19; 514/665; 134/3, 22.13, 22.14, 22.16, 22.17, 22.19

(56) References Cited

U.S. PATENT DOCUMENTS

| | | | |
|---|---|---|---|
| 3,933,427 | 1/1976 | Bohnsack et al. | 252/181 |
| 4,332,967 | 6/1982 | Thompson et al. | 564/162 |
| 4,539,230 | 9/1985 | Shimizu et al. | 427/230 |
| 4,561,981 | 12/1985 | Characklis | 422/7 |
| 4,696,763 | 9/1987 | Bentley et al. | 252/391 |
| 4,719,036 | 1/1988 | Clubley et al. | 252/391 |
| 4,719,083 | 1/1988 | Baker et al. | 422/15 |
| 4,751,051 | 6/1988 | Thompson et al. | 422/12 |
| 4,816,061 | 3/1989 | Walter et al. | 514/665 |
| 4,885,097 | 12/1989 | Amjad et al. | 210/701 |
| 4,935,065 | 6/1990 | Bull et al. | 134/22.13 |
| 4,952,326 | 8/1990 | Amjad et al. | 210/701 |
| 4,952,327 | 8/1990 | Amjad et al. | 210/701 |
| 4,973,409 | 11/1990 | Cook et al. | 210/699 |
| 4,978,456 | * 12/1990 | Sprague | 210/699 |
| 4,982,004 | 1/1991 | Relenyi et al. | 564/488 |
| 5,025,038 | 6/1991 | Relenyi et al. | 514/665 |
| 5,093,020 | 3/1992 | Paul et al. | 252/82 |
| 5,118,534 | 6/1992 | Relenyi et al. | 427/384 |
| 5,130,052 | 7/1992 | Kreh et al. | 252/387 |
| 5,166,074 | 11/1992 | Vessey et al. | 436/103 |
| 5,200,105 | * 4/1993 | Cuisia | 252/180 |
| 5,407,597 | 4/1995 | Busch et al. | 252/389.23 |
| 5,447,475 | 9/1995 | Crump et al. | 134/42 |
| 5,601,723 | 2/1997 | Kirk et al. | 210/701 |
| 5,658,465 | 8/1997 | Nicholas et al. | 210/698 |
| 5,670,055 | 9/1997 | Yu et al. | 210/698 |
| 5,683,587 | 11/1997 | Ferrara et al. | 210/696 |
| 5,716,529 | * 2/1998 | Suzuki et al. | 210/697 |

OTHER PUBLICATIONS

Good–Rite® K–XP192 Sodium Polyacrylate Material Safety Data Sheet, GR–XP192 (Aug. 1995).
Good–Rite® K–798 Acrylate Terpolymer Material Safety Data Sheet, GR–798 (Aug. 1993).
AMSA, Inc., Anti–Biofouling General Catalogue No. 101297.
AMSA, Inc., AMSA DTEA product information.

* cited by examiner

*Primary Examiner*—Peter A. Hruskoci
(74) *Attorney, Agent, or Firm*—Connolly Bove Lodge & Hutz, LLP

(57) ABSTRACT

Water-circulating systems are treated with an aqueous, alkaline composition comprising I) an organo-phosphorus chelating agent, II) an acrylate homopolymer, III) a salt of an acrylic copolymer, a portion of the repeating units of which contain sulfonate groups, IV) a molybdate salt, and V) a salt of a fused-ring aromatic triazole.

This composition (which is formulated in accordance with a specific order of addition of the ingredients) is effective against white rust (corrosion of galvanized metal parts). When the water-circulating system is also fouled with a biofilm, it is preferred to introduce a biofilm remover having biocidal, surfactant, and chelating properties into the system, but the biofilm remover is introduced separately from the above-described composition. The preferred biofilm removers are compounds of the formula $R-S-A-NR^1R^2$ where R is an aliphatic group having at least 8 carbon atoms, A is an alkylene group having 1 to 6 carbon atoms, $R^1$ and $R^2$ are the same or different and are hydrogen or an aliphatic group, or $R^1$ and $R^2$, together with the nitrogen of formula I, form a heterocyclic aliphatic group.

6 Claims, No Drawings

METHOD FOR TREATING WATER CIRCULATING SYSTEMS

FIELD OF THE INVENTION

This invention relates to methods for treating water-circulating systems such as systems for cooling towers. An aspect of this invention relates to compositions utilized in the treatment methods and methods for preparing them. Still another aspect of this invention relates to treatments for obtaining control over (preventing, inhibiting, removing, etc.) so-called "white rust" in water-circulating systems containing metal parts having coatings containing metallic zinc.

DESCRIPTION OF THE PRIOR ART

Virtually all water-circulating systems need repeated anti-fouling treatments, e.g. to remove corrosion or organic material that builds up and deposits inside conduits and other parts of the system. A wide variety of anti-foulants (anti-corrosion agents or anti-sealants, biocides, surface-active agents, and the like) are available for such treatments. These agents can also have a prophylactic effect by inhibiting the corrosion chemistry, preventing the deposition of organic materials, or by reducing the population of microbes (bacteria, fungi, and algae) in water circulating through the system. Indeed, the biological aspect of the fouling of water-circulating systems has extremely important consequences. In addition to microbial-induced corrosion, the formation of slimes which become "biofilms" (coatings or layers of organic material, particularly on the insides of conduits), interference with efficient heat exchange, and deterioration of wooden elements of the system or painted surfaces, there are also health concerns. Pathogenic microorganisms can thrive in water-circulating systems and can affect people and animals, e.g. by becoming airborne.

Some forms of metal corrosion are especially difficult to deal with and yet are encountered rather often in water-circulating systems. Perhaps foremost among this very troublesome corrosion chemistry is the phenomenon called "white rust".

The formation of white rust stems from the corrosion or oxidation of metallic zinc, particularly in alkaline media. The compounds formed as a result of this corrosion are believed to include zinc oxide, zinc hydroxide, zinc carbonate, and/or physical and chemical combinations of these compounds. Since zinc is attacked by both acids and bases, it is an excellent sacrificial metal and is often used in coatings which protect other metals, e.g. the ferrous metals. The use of zinc in coatings to make galvanized metal is in fact the largest single use of this metal. The coatings can be provided by hot-dipping, electrodeposition, or by spraying atomized particles of molten zinc. Galvanized metals are widely used in water-circulating systems, hence methods for preventing or removing white rust have significant utility in the maintenance of these systems.

The methods for treating white rust which have the most promise for long-term efficacy are those which involve adding multi-component compositions containing aggressive chelating agents and a molybdate salt to the main water stream or the make-up water stream. The organo-phosphorus chelating agents are especially effective, and a molybdate commonly used is the mono-molybdate sodium salt, $Na_2MoO_4$, available commercially as the dihydrate. According to U.S. Pat. No. 5,407,597 (Busch et al, issued Apr. 18, 1995), sodium diethyl dithiocarbamate is also useful in such compositions, along with the organo-phosphorus chelating agents and a molybdate. The thiocarbamates are known to have strong complexing effects with respect to certain metals or metallic cations.

However, depending upon the degree of biofilm buildup in the water-circulating system, even so-called multipurpose compositions can be blocked from access to the white rust. Biofilms can be controlled with the aid of various chemicals, e.g. biocides, biostats, and surface-active agents. The linear alkylbenzene sulfonates are typical of surfactants which have been employed in anti-fouling treatments. See, for example, U.S. Pat. No. 5,670,055 (Yu et al), issued Sep. 23, 1997. Biostats and biocides reduce the population of microbes which can play a major role in biofilm formation and other forms of contamination. Surface-active agents help to disperse fats and other oleaginous materials which can coat the interior of water pipes. There are two general types of biocides: oxidizing and non-oxidizing. Chlorine-releasing agents such as the hypochlorites are typical of the oxidizing type, and quaternary ammonium compounds are typical of the non-oxidizing type. Still another class of anti-fouling chemicals—which have both biocidal and surfactant properties and which are themselves oxidized then hydrolyzed in situ to relatively harmless degradation products—is described in commercial literature of AMSA, Inc. of Midland, Mich., U.S.A. and in patents such as U.S. Pat. No. 4,751,051 (Thompson et al, issued Jun. 14, 1988); see also U.S. Pat. No. 5,670,055, cited previously.

Compounds which remove scale, inhibit corrosion, or inhibit deposition of scale can be polymeric as well as monomeric, particularly if the polymer has water-compatibility, as in the case of salts of acrylic acid-type polymers. Acrylic-type polymers known to be useful as water-treatment chemicals are available in both acid and salt forms and are disclosed in trade literature of the B.F. Goodrich Company of Akron, Ohio, U.S.A. and in the Amjad et al U.S. Pat. Nos. 4,885,097 (issued Dec. 5, 1989), 4,952,326, and 4,952,327 (Aug. 28, 1990).

Water treatment is a highly developed art, and any exhaustive discussion of this field would have to be voluminous. The references mentioned above are believed to be representative of the state of the art, but the patent and trade literature is far more extensive than these few references. Notwithstanding this vast amount of work in the field of treating water-circulating systems, however, considerable further improvement is needed, particularly for truly effective, continual removal or prevention of white rust, for fully adequate cleaning of the entire water-circulating system (including not only pipes but also sumps, trays, pumps, and other elements of the system exposed to water), and effective cleaning at normal ambient temperatures, not just in parts of the system where heat is present.

SUMMARY OF THE INVENTION

It has now been discovered that a highly improved treatment of water-circulating systems is provided by treating water in the water-circulating system with an aqueous composition comprising, in combination (including any products formed by chemical or physical interaction or transformation of any ingredient or ingredients):

I) an organo-phosphorus chelating agent,
II) an acrylate homopolymer,
III) a salt of an acrylic copolymer, a portion of the repeating units of which contain sulfonate groups,
IV) a molybdate salt, and
V) a salt of a fused-ring aromatic triazole (the fused aromatic ring is preferably monocyclic, as in the case of unsubstituted or substituted benzotriazoles);

optionally, ingredients such as those designated I to III can be added in acid form and neutralized in situ.

This composition (hereafter referred to as "Composition A" or "Component A") preferably contains a bromide salt (e.g. an alkali metal bromide) and a sufficient amount of a basic compound to insure that the pH will be at least about 10.5. To provide an aqueous medium capable of dissolving or otherwise uniformly distributing the above-listed components, Composition A is generally at least 40% by weight of water; even more typically, water is the major ingredient. The composition is surprisingly effective in controlling (preventing or removing) white rust.

In the event that the corrosion in the water-circulating system is relatively inaccessible to the above-described composition because of biofilm formation, an alternative embodiment of this invention is effective in exposing as well as essentially removing the corrosion. In this embodiment, the entire Composition A becomes one of a plurality of components used to treat the system. Thus, water in the water-circulating system is treated with aforementioned Composition A, as "Component A", and with at least one biofilm-removing compound ("Component B"). The preferred biofilm-removing compound (which can optionally be administered with oxidizing or non-oxidizing biocides or biostats) comprises a compound of the formula I

$$R\text{—}S\text{—}A\text{—}NR^1R^2 \quad\quad\quad (I)$$

where

R is an aliphatic group having at least 8 carbon atoms,

A is an alkylene group having 1 to 6 carbon atoms, $R^1$ and $R^2$ are the same or different and are hydrogen or an aliphatic group, or $R^1$ and $R^2$, together with the nitrogen of formula I, form a heterocyclic aliphatic group.

Most water-circulating systems generally require some make-up water, be they "open" or evaporative cooling systems or be they closed or partially closed. In the alternative embodiment of this invention, Component A is preferably added incrementally to the make-up water stream, the size and frequency of increments depending upon the accessibility of the layers of mineralized or inorganic material (e.g white rust), the thickness of these layers, and the stage of treatment. Component B is added either continuously or incrementally, the dosing being dependent largely upon the amount of biomass or biofilm in the system. Component B is preferably added to the bulk or main stream of the water. Although this invention is not bound by any theory, it is believed that Component B improves access to corroded surfaces by attacking any biofilm covering those surfaces, thereby facilitating treatment of the corrosion with Component A. It is further believed that Component B can also contribute to the removal of white rust.

In addition to the above-described compositions and methods for using them, this invention also relates to a method for formulating Composition (or Component) A. In this method, a major amount of the water of this aqueous composition is first charged to a mixing zone, the remainder of the water for the aqueous medium being added last. The organo-phosphorus phosphorus chelating agent ("I") and the anti-scalant polymers ("II" and "III") are then mixed into the initial charge of water in the mixing zone. Since all the important ingredients of Composition A have water-compatibility, mixing results in stable, uniform distribution (dissolution, dispersion, or fine suspension) of these ingredients throughout the medium The next step is to adjust the pH of the aqueous medium to at least about 10.5 (preferably >11) with a base. The molybdate ("IV") is then mixed into the resulting alkaline aqueous medium. If a bromide salt is to be included in the composition, it is added next, followed by pH monitoring to insure that the pH is within a predetermined range (preferably at least about 10.5, e.g. 10.5 to about 12; a further pH adjustment can be made if the pH is too low ). The last ingredient to be added, other than the balance of the water, is an unsubstituted or substituted benzotriazole.

DETAILED DESCRIPTION

As noted previously, this invention is not bound by any theory, but testing of Composition A strongly suggests that the more complex the structure of corrosion layers (e.g. in piping, trays., etc.), the more resistant these layers are to dispersion, suspension, or dissolution. In the case of white rust, for example, the structure of corroded areas can include not only oxidized zinc compounds and biomass in complex combinations which virtually defy description, but also other inorganic compounds (such as carbonates) which help to build an inorganic/organic matrix which it is difficult to break down. For such complex corrosion matrices, strong chelating agents and molybdate salts are not sufficient by themselves to remove white rust efficiently and reliably. A combination of acrylic-type polymers, in water-compatible salt form, is needed (the salt form of these polymers is believed to have a different configuration than the acid form), and, to add to the spectrum of inhibition or removal, a benzotriazole-type compound should be included. The presence of the salt form of these polymers can be insured by including a strong base such as an alkali metal hydroxide in the composition.

If biofilm material does not shield or reduce access to white rust, as in newly-constructed systems, it is believed that Composition A alone can remove or prevent the formation of white rust. Unfortunately, in most water-circulating systems which have been operating for some time, biofilm formation is almost inevitable. The preferred biofilm remover (a compound of formula I, $R\text{—}S\text{—}A\text{—}NR^1R^2$) has been said to be useful to treat galvanized metals, but in a preferred embodiment of this invention, the rate of addition of biofilm remover and Composition A are almost infinitely variable with respect to each other, because Composition A and the biofilm remover are added in separate operations.

The following description provides further explanation of the methods and compositions of this invention.

I. Methods

Composition A, described above, is believed to be effective in inhibiting the formation of white rust. Accordingly, if there is little or no existing white rust in the water-circulating system, or if the biofilm on top of the white rust is discontinues or very thin, the method of this invention does not necessarily require the use of any specific biostat or biocide and can be useful even without the presence of a biocide or biostat in the system. In this event it is still preferred that Composition A be added incrementally to the make-up water (maintenance water) stream.

Typical water-circulating systems treated in accordance with this invention include at least one heat-exchange or heat-rejection element or unit such as the cooling towers of a nuclear power plant or the heat-exchangers which are part of water-cooled systems used to provide temperature control in offices and living spaces. This invention is also useful in connection with the cooling of effluents from steam power plants, chemical synthesis or refinement facilities, geothermal heat-exchangers, and other systems in which circulating water is subjected to temperature changes. Not all water-circulating systems are centered around a heat-exchange process (as in the case of reverse-osmosis plants, desalination plants, ion exchangers or water polishers, simple boilers for steam lines, reservoirs used in processing water, and systems for the transport of products or by-products, e.g. combustion products), but heat-exchangers can pose the most serious challenges to water-treatment technology, due to the wide range of temperatures which can occur throughout the various components of these systems. Moreover, some cooling systems are open or evaporative, which can bring water in the system into contact with air, resulting in absorption of carbon dioxide from the atmosphere, thereby contributing to carbonate formation. Other types of cooling systems are closed or recirculating, minimizing contact with air, but can be just as demanding in terms of maintenance. The thermal efficiency of heat-exchange systems can be very dependent upon how "clean" they are with respect to corrosion and biofilm formation. It can be difficult, technologically, to run these systems with water which is low in pH and typically the water is alkaline. Zinc and other metals which are relatively high in the electromotive series can be progressively attacked by alkaline water, due to the formation of soluble anions such as $Zn(OH)_4^=$.

The water in these systems can vary widely in hardness (magnesium and calcium content). High levels of hardness can contribute to scale formation but oftentimes such hardness cannot be controlled without incurring unreasonable expenses for water polishing and the like. For this reason, any salts used in compositions of this invention preferably contain little or no alkaline earth metal cation and carbonate or sulfate anion content. Certain ions are considered, in the terminology of water technologists, to be "stressful". For example, the zinc or zincate ions typically present in systems containing galvanized metal parts impose high "stress" on anti-foul art treatments, which presumably is one of the reasons why zinc corrosion is so difficult to deal with. The least stressful cations are monovalent, e.g. the alkali metal and ammonium ions. Anions such as carbonate and sulfate, as indicated, can also contribute to scale formation, but sulfonate and phosphonate anions are less stressful.

The usual dosing of Composition A in the make-up water ranges from 50 to 10,000 parts per million (ppm), more typically less than 1,500 ppm, e.g. 100 to 600 ppm per dose, depending, in part, on the amount of biofilm still inside the system (i.e. accessibility or lack of accessibility of corrosion such as white rust) and the amount of corrosion to be removed. The dosing does not have to be continuous and is preferably done periodically. For example, if Composition A has good access to a layer of white rust on the surface of galvanized metal parts of the system, the dosing can be done in just one cycle of concentration through the system, and the amount of white rust will be curtailed. Preferably, a dose of Composition A is added to each of 2 to 20—more typically 2 to 10—concentration cycles.

When treatment of biofilm is important to the method of this invention, as it often is, both Composition (Component) A and Composition (Component) B are employed. Component B can include diluents or viscosity-modifiers such as alkylene glycols, but the key ingredient of this composition is an anti-foulant with biocidal, chelating, and surface-active properties. Any of the oxidizing or non-oxidizing biocides mentioned in a patent to Characklis, U.S. Pat. No. 4,561,981 (Dec. 31, 1985) can also be used, particularly the oxidizing biocides (typified by chlorine or chlorine-releasing compounds, bromine-releasing compounds, haloamines, and ozone), but it is preferred that at least one biofilm remover be present which has surface active properties and is environmentally friendly. Foremost among these biofilm removers are the compounds of formula I $$R\!-\!S\!-\!A\!-\!NR^1R^2 \qquad (I)$$

where
R is an aliphatic group having at least 8 carbon atoms,
A is an alkylene group having 1 to 6 carbon atoms,
$R^1$ and $R^2$ are the same or different and are hydrogen or an aliphatic group, or $R^1$ and $R^2$, together with the nitrogen of formula I, form a heterocyclic aliphatic group.

In the presence of a biofilm, these compounds are oxidized, and the oxidation product or products is or are hydrolyzed to environmentally tolerable degradation products such as aminoalkylsulfonic acids or aminoalkylsulfonates, aliphatic residues (e.g. straight-chain hydrocarbons), and possibly carbon dioxide.

It is strongly preferred that the compound or compounds of formula I be added to the water of the water-circulating system independently of the Component A addition. This goal can be accomplished with great benefits in terms of effectiveness by introducing Component B through the main stream of the water-circulating system and introducing Component A through the make-up stream. Stated another way, it is preferred that Components A and B not be pre-mixed before introduction into the system. Although a mixture of Compositions or Components A and B can be effective, it is presently believed to be highly advantageous when the feed rates of the two components or compositions can vary with respect to each other. During hot summer months, for example, it can be useful to increase the flow rate of biofilm remover, at least in short bursts, while maintaining the dosing of Component A at previously-established levels or even curtailing it somewhat. Moreover, it is not presently known how and to what extent Components A and B can interact with each other, and it is preferred that any such interaction take place in situ, in the water of the water-circulating system. It is permissible and generally desirable, however, for certain individual ingredients of Component A to interact with each other prior to introducing this composition into the water-circulating system; for example, a pH-adjusting agent such as an alkali metal hydroxide can convert any acrylic-type polymers in acid form into the sail: form, which is desirable. Not only is the salt form more compatible with aqueous media, it is believed also that the salt form has a more useful molecular configuration than the acid form.

Component B, preferably containing a compound of formula I, above, can be added using a pump and a feed line communicating with the main body of water in the system to be treated. For example, the pump intake or output can be in communication with the system sump or piping within the system. A compound of formula I can be either slug-fed or added continuously. Continuous, 24-hour-per-day feeding is preferred. Commercially-available embodiments of compounds of formula I are typically sold as 15 weight-% strength, mildly acidic (pH 3 to 6) aqueous solutions. It is preferred to dilute this concentration by a factor of 2 to 20, e.g. about 10 times. The diluted (e.g. 1.5 weight-%) product is preferably added to the main water stream at the rate of about 10 to 50 kg per 10,000 liters of system water per week (roughly 8 to 40 lb/1000 gal/week), preferably 20 to 40 kg per 10,000 liters per week (roughly 20 to 30 lb/1,000 gal./wk.), depending, in part, upon the degree of dilution, the amount of biofilm in the system, and the like.

In a typical office cooling system, for example, the pH of the circulating water is in the range of 7 to 9 or even higher, depending on carbonate levels. Treatment of this water in accordance with the methods of this invention insures that the pH will be at least about 7.5, typically 7.5 to 9. Because the methods of this invention break down corrosion and biofilm with a degradable biofilm remover and with, among other things, ion-exchange and chelation mechanisms, the compositions used in this invention cause essentially no corrosion of underlying metal surfaces and even seem to have a passivating effect upon galvanized metal.

The method for formulating Composition A comprises the steps outlined above. In the following description of a preferred embodiment of this method, percentages are by weight, unless otherwise indicated, and the percentages generally relate to the total weight of the fully-formulated composition, except where concentrations or strengths or portions of the total to be added are indicated. It should be understood that all final percentages of individual ingredients are to be adjusted mathematically relative to each other so that their total does not exceed 100%. Conventional stirring equipment is used to blend the ingredients.

About 60 to 90% of the water of this composition is added to the mixer first, and the organo-phosphorus chelating agent (1 to 10 wt.-%, preferably 1.5 to 5% ) and the polymers (each in the amount of 5 to 20 wt.-%, preferably 5 to 15%) are added to this relatively large volume of water (the total amount of water in the completely formulated Composition A can be at least 50% by weight of the composition). A pH-adjusting agent, preferably a concentrated aqueous solution of an alkali metal hydroxide such as KOH, NaOH, or LiOH (20 to 60 weight-% KOH being preferred) is then added in the amount of about 5 to 15 wt.-%. It is also preferred that a small portion of the alkali metal hydroxide solution be reserved for subsequent pH adjustments. A molybdate salt, preferably one that is readily available (e.g the mono-, di-, or tri-molybdate, preferably in alkali metal salt form) is added in the amount of 5 to 15 wt.-%. The molybdate can be added as a solid, and, in the amounts contemplated by this invention, it can dissolve in the water in the mixer. The bromide salt (e.g. an alkali metal bromide) in the amount of up to 10 wt.-% is then dissolved in the water of the composition. After addition of the molybdate (or after the addition of the bromide salt, when a bromide is included in the composition), it is considered very important to monitor or check the pH, because, generally speaking, a further pH adjustment will be needed. The further pH adjustment can be carried out by adding the balance (e.g about 5 to 15 wt.-% of the total added) of the alkali metal hydroxide solution. The alkali metal salt of the substituted or unsubstituted 1-H-benzotriazole is then added in the amount of about 1 to 10 wt.-%, followed by addition of the remaining amount of water.

II. Compositions

It is particularly preferred that Composition A contain the following ingredients.

I) $R^3(COOM)_a(PO_bM'_2)_c$ wherein $R^3$ is an aliphatic group having 2 to 6 carbon atoms, M and M' are the same or different and are hydrogen, an alkali metal, an ammonium group, or, less preferably, one equivalent, per mole of said chelating agent, of an alkaline earth metal; a is a number from 1 to 5, b is a number from 2 to 3, and c is a number from 1 to 3;

II) an alkali metal polyacrylate homopolymer of relatively low weight-average molecular weight ($M_w$) and low viscosity, e.g. a weight-average molecular weight, determined by gel permeation chromatography (GPC) of about 1,000 to about 10,000, preferably 1,000 to 3,500, and a viscosity (in centipoise at 25° C.) of 10 to 1,000, preferably 50 to 450;

III) a terpolymer containing alkali metal salt units of the following formulas: $-(-CH_2-C[R^4][COOM'']-)-$,

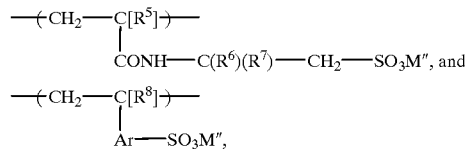

wherein $R^4$ through $R^8$ are the same or different and are alkyl groups of 1 to 4 carbon atoms (preferably methyl or ethyl), Ar is an aromatic ring, and the M'' cations, which can be the same or different, are alkali metal cations; this polymer is also relatively low in weight-average molecular weight, determined by GPC, the $M_w$ can vary from about 1,000 to about 20,000, preferably less than about 10,000;

IV) alkali metal molybdate,

V) an alkali metal salt of unsubstituted or substituted 1-H-benzotriazole, wherein the fused benzene ring of the benzotriazole is optionally substituted with a least one alkyl group of 1 to 4 carbon atoms (preferably a methyl group), VI) sufficient water to provide an aqueous solvent medium, VII) optionally, an alkali metal bromide, and VIII) optionally but preferably, sufficient alkali metal hydroxide to raise the pH of said component B to about 10.5 to about 12.

The percentages of these eight ingredients, based on the total weight of the composition, has been discussed in connection with the method of preparation of Composition A.

A particularly effective organo-phosphorus chelating agent is a compound of the formula $R^3(COOM)_3(PO_3M'_2)$ wherein $R^3$ is an aliphatic group having 3 carbon atoms, M and M' are the same or different and are hydrogen or an alkali metal. Such compounds can be added in the acid form (M and M'=H), because an appropriate pH adjustment will result in full or partial neutralization of the carboxylic and phosphonic acid groups. The preferred species of this formula is 1,2,5-tricarboxybutanephosphonate (also known as 2-phosphono-1,2,4-butanetricarboxylic acid), and the preferred benzotriazole compounds are:

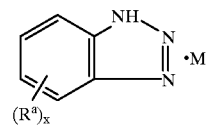

where $R^a$ is a typical aromatic substituent such as alkyl, x is zero to 4, and M is a monovalent cation such as an alkali metal or organic ammonium cation.

Generally speaking, where alkali metal salts are used in these compositions, the alkali metal cation is typically $Na^+$ or $K^+$ or, less preferably, $Li^+$. For neutralizations of acidic compounds or pH adjustments with strong bases (bases having a $pK_b$ of <5), alkali metal hydroxides are preferred, but organic ammonium hydroxides (e.g. quaternary ammonium hydroxides) can be used, as can alkali metal salts of weak acids, e.g. weak organic acids such as the carboxylic acids or weak inorganic acids other than carbonic acid.

The preferred acrylate copolymer is a terpolymer, in the salt form, of acrylic acid, acrylamidoalkane sulfonic acid, and sulfonated polystyrene or sulfonated methylstyrene.

The preferred key ingredient of Composition B has been described previously (see formula I, above). Compounds of the formula R—S—(CH$_2$)$_w$—NH$_2$, where R is a straight-chain aliphatic group having 8 to 20 carbon atoms, and w is a number from 1 to 4, preferably 2 to 4, are especially preferred. The —S-alkylene-NH$_2$ portion of these compounds acts like a chelating group, with the short alkylene chain (e.g. ethylene) providing "spacer" atoms. The presence of both polar and non-polar groups in these compounds appears to impart some surfactant activity as well. The lipophilic (non-polar) end of these compounds can penetrate phospholipid- and polysaccharide-containing layers or envelopes, thus gaining access to the interior of microbial cells and interfering with their internal biochemistry. A commercially-available species of these compounds is decyl thioethyl ether amine ("DTEA"), which is typically blended with an alkylene, glycol such as propylene glycol, a carboxylic acid (to provide mild acidity in the pH range of 3 to 6), and water. The compound DTEA is soluble in water and has a high flash point.

If pathogenic organisms are present in the water of the circulating system, additional biocidal compounds can be introduced, either through Component A or Component B. As noted previously, oxidizing biocides are preferred.

The following non-limiting Example illustrates the principles and practice of this invention without in any way limiting its scope. All parts and percentages are by weight unless otherwise indicated.

EXAMPLE 1

Formulation of Composition A

A fully-formulated Composition A was prepared from the following ingredients. The ingredients are listed without regard to physical or chemical interactions which can affect them,, but it should be understood that such interactions can occur:

| Ingredients | Parts |
| --- | --- |
| Water | 53.4 |
| 2-phosphono-1,2,4-butanetricarboxylic acid ("PBTC") | 4.0 |
| Sodium polyacrylate ("GOOD-RITE" K-XP-192, a product of B. F. Goodrich, M$_w$ by GPC: 2,800, 50% solids water solution) | 10.0 |
| Acrylate terpolymer ("GOOD-RITE" K-798, 48% active solids in water solution, partially neutralized, pH = 2.5 to 3.1) | 8.0 |
| Potassium hydroxide (aqueous, 45%) | 9.0 |
| Sodium molybdate ("MolyCrystal") | 7.6 |
| Sodium bromide | 5.0 |
| Sodium tolyltriazole (aq., 50%) | 3.0 |
| Total parts | 100.0 |

Formulation Procedure

A mixing chamber was charged with 42.7 parts of water, and the PBTC, XP-192, and K-798 were blended with the water. Then 8.0 parts of the 45% aqueous KOH solution were added, followed by 7.6 parts of MolyCrystal. The MolyCrystal was mixed into the aqueous medium until it dissolved. The sodium bromide was added next, and the pH was measured. A sufficient amount of aqueous KOH was added (approximately one part) until the pH was within the range of 11 to 11.5. The sodium tolyltriazole solution was then added, followed by 10.7 parts of water. It is found that the resulting composition can remove white rust.

EXAMPLE 2

Use of Composition A, Along with DTEA, To Treat Building Cooling System

The water-cooled system controls temperature in a high-rise office building and includes an evaporator, a chiller, and similar heat-rejection equipment. The piping in the system was seriously fouled with white rust and biofilm. A stream of make-up water is needed to maintain the water level in the main body of water in the system. The system also has piping for the main body of water. A 1.5% aqueous solution (specific gravity 1.02) of decyl thioethyl ether amine (DTEA) was continuously pumped into the main body of water at the rate of 25 lb/1,000 gal. of water/wk. After the DTEA was being introduced, and for the next ten cycles of recirculation through the system, Composition A was introduced in doses of 600 ppm per cycle. After one week of treatment, the white rust layer in the system began to decrease in thickness.

What is claimed is:

1. A method for treating a water-circulating system and preventing, inhibiting and/or removing white rust, comprising the step of treating the water in said system with a composition comprising:

I) $R^3(COOM)_3(PO_3M'_2)$ wherein $R^3$ is an aliphatic group having 3 carbon atoms, M and M' are the same or different and are hydrogen or an alkali metal, II) an alkali metal polyacrylate homopolymer, III) a polymer containing alkali metal salt units of the following formulas: —(—CH$_2$—C[R$^4$][COOM"]—)—,

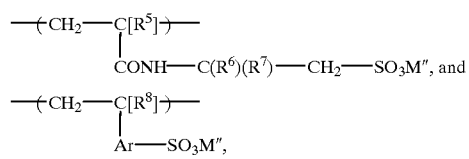

wherein $R^4$ through $R^8$ are the same or different and are alkyl groups of 1 to 4 carbon atoms, Ar is an aromatic ring, and the M" cations, which can be the same or different, are alkali metal cations, IV) alkali metal molybdate, V) an alkali metal salt of unsubstituted or substituted 1-H-benzotriazole, wherein the fused benzene ring of the benzotriazole is optionally substituted with a least one alkyl group of 1 to 4 carbon atoms, VI) optionally, an alkali metal bromide, and VII) optionally, sufficient alkali metal hydroxide to raise the pH of said composition to about 10.5 to about 12, and sufficient water to provide an aqueous solvent medium for the components of said composition wherein the water circulating system includes metallic elements, and wherein at least one metallic element comprises galvanized metal, and wherein said composition is brought into contact with the galvanized metal, and thereby preventing, inhibiting and/or removing white rust.

2. A method as claimed in claim 1, wherein the amounts of components (I) through (VII) are as follows:

I) 1 to 10 weight-%,

II) 5 to 20 weight-%,

III) 5 to 20 weight-%,

IV) 5 to 15 weight-%,

V) 1 to 10 weight-%,
VI) 0 to 10 weight-%,
VII) 0 to 10 weight-%;
and the amount of water in the composition is sufficient to keep components (I) through (VII) stably dissolved.

3. A method according to claim 1, wherein the water circulating system includes at least one make-up water element containing make-up water and wherein the composition is added to the make-up water.

4. A method according to claim 3, wherein at least one biofilm-removing compound is added to water in the water-circulating system.

5. A method according to claim 4, wherein said biofilm-removing compound has the formula $$R-S-A-NR^1R^2$$

where
R is an aliphatic group having at least 8 carbon atoms,
A is an alkylene group having 1 to 6 carbon atoms,
$R^1$ and $R^2$ are the same or different and are hydrogen or an aliphatic group, or $R^1$ and $R^2$, together with the nitrogen of formula I, form a heterocyclic aliphatic group.

6. A method according to claim 4, wherein said biofilm-removing compound has the formula $R-S-(CH_2)_w-NH_2$, where R is a straight-chain aliphatic group having 8 to 20 carbon atoms, and w is a number from 1 to 4.

* * * * *